United States Patent
Wechsler et al.

(10) Patent No.: US 11,857,837 B2
(45) Date of Patent: Jan. 2, 2024

(54) INSTRUMENTED RESISTANCE EXERCISE DEVICE

(71) Applicant: Trustees of Dartmouth College, Hanover, NH (US)

(72) Inventors: Emily Wechsler, Dallas, TX (US); Ryan Halter, Lyme, NH (US); John A. Batsis, Hanover, NH (US)

(73) Assignee: Trustees of Dartmouth College, Hanover, NH (US)

( * ) Notice: Subject to any disclaimer, the term of this patent is extended or adjusted under 35 U.S.C. 154(b) by 503 days.

(21) Appl. No.: 17/055,412

(22) PCT Filed: May 17, 2019

(86) PCT No.: PCT/US2019/032875
§ 371 (c)(1),
(2) Date: Nov. 13, 2020

(87) PCT Pub. No.: WO2019/222630
PCT Pub. Date: Nov. 21, 2019

(65) Prior Publication Data
US 2021/0213329 A1 Jul. 15, 2021

Related U.S. Application Data (60) Provisional application No. 62/672,827, filed on May 17, 2018.

(51) Int. Cl.
*A63B 24/00* (2006.01)
*A63B 21/00* (2006.01)
*A63B 21/055* (2006.01)

(52) U.S. Cl.
CPC .... *A63B 24/0062* (2013.01); *A63B 21/00043* (2013.01); *A63B 21/0552* (2013.01);
(Continued)

(58) Field of Classification Search
CPC .......... A63B 24/0062; A63B 21/00043; A63B 21/0552; A63B 2220/17; A63B 2220/51;
(Continued)

(56) References Cited

U.S. PATENT DOCUMENTS

| | | |
|---|---|---|
| 3,510,130 A | 5/1970 | Ferdinand |
| 3,640,530 A | 2/1972 | Henson et al. |

(Continued)

FOREIGN PATENT DOCUMENTS

| | | | | |
|---|---|---|---|---|
| WO | WO-2011041678 A1 | * | 4/2011 | ............ A61B 5/224 |
| WO | WO 2017/179997 A1 | | 10/2017 | |
| WO | WO 2019/222630 A1 | | 11/2019 | |

OTHER PUBLICATIONS

Rolyan® Smart Handle, Patterson Medical (2014), 4 pages.
(Continued)

*Primary Examiner* — Sundhara M Ganesan
*Assistant Examiner* — Jacqueline N L Loberiza
(74) *Attorney, Agent, or Firm* — Neal, Gerber & Eisenberg LLP (57) ABSTRACT

Devices and methods are disclosed for remote clinical monitoring performance of exercises using an instrumented resistance device (100). An example device (100) includes a resistance band (120) having a first end (122) and a second end (124). A first handle (130) connected to the first end (122) and a second handle (140) connected to the second end (124) of the resistance band (120). The device (100) further includes a force sensing assembly (150) positioned between the first handle (130) and the first end (122). The force sensing assembly (150) includes a force sensor (156) connected to the resistance band (120), a microcontroller (182) connected to the force sensor (156) to receive a set of load force measurements from the force sensor (156), and a communication module (184) connected to the microcon-
(Continued)

troller (182) to transmit the set of load force measurements to a local data receiving device (170).

20 Claims, 7 Drawing Sheets (52) U.S. Cl.
CPC ...... *A63B 21/4035* (2015.10); *A63B 2220/17* (2013.01); *A63B 2220/51* (2013.01); *A63B 2220/62* (2013.01); *A63B 2220/833* (2013.01); *A63B 2225/50* (2013.01)

(58) Field of Classification Search
CPC .......... A63B 2220/62; A63B 2220/833; A63B 2225/50
See application file for complete search history.

(56) References Cited

U.S. PATENT DOCUMENTS

| | | | |
|---|---|---|---|
| 4,678,184 | A | 7/1987 | Neiger et al. |
| 5,538,486 | A | 7/1996 | France et al. |
| 5,697,869 | A | 12/1997 | Ehrenfried et al. |
| 6,285,356 | B1* | 9/2001 | Armstrong ............. G05G 9/047 345/167 |
| D892,237 | S | 8/2020 | Bentsen et al. |
| 11,161,012 | B1 | 11/2021 | Hendricks et al. |
| 11,389,699 | B2 | 7/2022 | Mallard et al. |
| 11,623,114 | B2 | 4/2023 | Mohieldin et al. |
| 2002/0086779 | A1 | 7/2002 | Wilkinson |
| 2014/0194250 | A1 | 7/2014 | Reich et al. |
| 2014/0221164 | A1 | 8/2014 | Siniora |
| 2014/0287876 | A1 | 9/2014 | Etter et al. |
| 2015/0170530 | A1 | 6/2015 | Damman et al. |
| 2015/0253210 | A1 | 9/2015 | Ashby et al. |
| 2016/0332019 | A1 | 11/2016 | Rollins |
| 2017/0036063 | A1 | 2/2017 | Goldston et al. |
| 2017/0304679 | A1 | 10/2017 | Orfield |
| 2018/0214729 | A1 | 8/2018 | Rubin et al. |
| 2019/0269967 | A1* | 9/2019 | Thomas ........... A63B 21/00185 |
| 2019/0290962 | A1 | 9/2019 | Osbrink |
| 2019/0344123 | A1 | 11/2019 | Rubin et al. |
| 2020/0047055 | A1 | 2/2020 | Ward et al. |
| 2020/0121968 | A1 | 4/2020 | Ismail |
| 2020/0289890 | A1 | 9/2020 | Kim et al. |
| 2021/0001171 | A1 | 1/2021 | Fung |
| 2021/0077849 | A1 | 3/2021 | Wehrell |
| 2021/0086031 | A1 | 3/2021 | Thomas |
| 2021/0128971 | A1 | 5/2021 | Orfield |
| 2021/0244995 | A1 | 8/2021 | Andrei et al. |
| 2021/0339078 | A1 | 11/2021 | Akeel et al. |
| 2021/0370122 | A1 | 12/2021 | Mohieldin et al. |
| 2022/0176187 | A1 | 6/2022 | Falahi et al. |
| 2022/0233905 | A1 | 7/2022 | Bar et al. |

OTHER PUBLICATIONS

Wechsler et al. Development of a smart TheraBand to assess strength. Journal of the American Geriatrics Soc., D76 (Apr. 26, 2017), 1 page.

The United States Patent and Trademark Office, International Search Report in International Application No. PCT/US2019/032875 (dated Jul. 24, 2019).

The United States Patent and Trademark Office, Written Opinion of the International Search Authority in International Application No. PCT/US2019/032875 (dated Jul. 24, 2019).

Mohieldin, Suehayla. BandPass: A smart resistance exercise band to monitor strength. ENGS 88 Honors Thesis, Dartmouth College Digital Commons, https://digitalcommons.dartmouth.edu/engs88/8 (Spring Jun. 6, 2019), 81 pages.

Petersen et al. Detection and Monitoring of Repetitions Using an mHealth-Enabled Resistance Band. IEEE Int Conf Connect Health Appl Syst Eng Technol. 22-24 (Sep. 2018), 6 pages.

* cited by examiner

INSTRUMENTED RESISTANCE EXERCISE DEVICE

CROSS REFERENCE TO RELATED APPLICATIONS

This patent application is a National Stage Entry of International Patent Application No. PCT/US2019/032875, filed on May 17, 2019, which claims priority to U.S. Provisional Patent Application No. 62/672,827, filed on May 17, 2018, the entire contents of which are fully incorporated herein by reference.

FEDERALLY SPONSORED RESEARCH OR DEVELOPMENT

This invention was made with government support under K23 AG051681 awarded by the National Institutes of Health, P30DA029926 awarded by the National Institutes of Health, and CNS-1314281 awarded by the National Science Foundation. The government has certain rights in the invention.

TECHNICAL FIELD

The present invention relates to a 'smart' resistance exercise device and, in particular, a 'smart' resistance exercise system that senses, quantifies, and transmits resistance exercise data (e.g., force profile) to a portable device such as a smart phone or smart watch.

BACKGROUND

Physical therapy is an important part of many multimodal treatment plans for musculoskeletal disability and weakness, particularly in older adults. Strength training using resistance exercises has proven efficacy in improving muscle strength in individuals with frailty or weakness.

For example, sarcopenia, the loss of muscle mass and weakness, is a recognized geriatric syndrome whose prevalence rates increase with age. As noted above, resistance bands are an integral part of any exercise program. This has been recommended in evidence-based guidelines by the American College of Sports Medicine, and through the National Institute on Aging Exercise Recommendations for Older Adults. In addition, sarcopenia has recently been granted an International Classification of Diseases 10th edition code.

Resistance bands are routinely used within clinical and home-based settings to improve muscle strength. Some difficulties that arise with exercise in a home-based setting or otherwise unsupervised setting are that (i) a health care provider is not able to assess the difficulty of a given exercise for the patient, (ii) a health care provider is not able see how well the patient is performing the exercise (e.g., the health care provider cannot assess the patient's progress on the exercise regimens without seeing them in person), and (iii) a health care provider is not able to empirically test the implementation of evidence-based interventions.

U.S. Pat. No. 5,538,486 ("France") is directed to an instrumented therapy cord. France depicts a resistive cord attached to a stationary fixation means. Moreover, the device in France is not small form-factor and may interfere with exercise and/or add weight to the resistive cord. France does not mention data transmission; nor does France mention communication with any data-receiving device let alone including or integrating other health data.

The Rolyan® Smart Handle and Smart Handle Pro are products available from Patterson Medical. The Rolyan devices are limited in output data to the number of reps and maximum force. Moreover, the Rolyan devices are not small form-factor and may interfere with exercise and/or add weight to the resistance exercise band. Moreover, the Rolyan devices are designed to work with flat bands and may not work or are inefficient to use with other shapes and sizes of bands, such as tubing.

Little technology exists around resistance exercise bands that can detect the force generated and the force profile while doing exercise. Similarly, little technology exists in interfacing these types of devices within a body area health network. Therefore, there is a need for new devices, systems, and methods to allow for strength assessment, allowing more automated and frequent snapshots of health information to aid clinicians in patient care, particularly in a home-based setting or otherwise unsupervised setting.

SUMMARY

The present disclosure provides devices, methods, and systems for recording a force profile generated by a subject performing resistance exercises.

In one aspect, this disclosure provides an instrumented resistance exercise device. The instrumented resistance exercise device comprises a resistance band having a first end and a second end; a first handle connected to the first end of the resistance band; a second handle connected to the second end of the resistance band; and a force sensing assembly positioned between the first handle and the first end of the resistance band. The force sensing assembly may include a force sensor connected to the resistance band, a microcontroller communicatively coupled to the force sensor and configured to receive a set of load force measurements collected by the force sensor, and a short-range wireless communication module coupled to the microcontroller and configured to transmit the set of load force measurements to a local data receiving device.

In one aspect, this disclosure provides a method for remote clinical monitoring of a prescribed set of exercises performed using an instrumented resistance exercise device. The method comprises connecting a force sensing assembly of the instrumented resistance exercise device, via a processing and communication module, to a local data receiving device; recording a force profile generated by a patient performing a resistance exercise using the instrumented resistance exercise device; transmitting the force profile, via the processing and communication module, to the local data receiving device; and transmitting, via the local receiving device, the force profile to a remote data server, wherein the force profile on the remote data server is accessed and analyzed by a health care provider via a network, and wherein analysis of the force profile enables the health care provider to adjust the prescribed set of exercises for the patient.

In one aspect, this disclosure provides an instrumented resistance exercise device configured to connectively couple to a local data receiving device. The local data receiving device includes an application configured to capture, track, monitor, and generate visual data that corresponds to individual exercises performed and force data collected while using the instrumented resistance exercise device. Furthermore, the application of the local receiving device may be configured to generate visual data or other such output that corresponds to a resistance of the exercise band used while performing exercises with the instrumented resistance exercise device.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the features, devices, methods, and systems described herein may be embodied in various forms, the drawings show and the specification describe certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, attached, connected, coupled, and the like, are not intended to be limited to direct mounting methods but should be interpreted broadly to include indirect and operably mounted, attached, connected, coupled, and like mounting methods. This specification is intended to be taken as a whole and interpreted in accordance with the principles of the present disclosure and as understood by one of ordinary skill in the art.

Various embodiments of the devices, methods, and systems disclosed herein include an instrumented resistance exercise device for recording, transmitting, and analyzing a force profile generated by a patient performing a variety of resistance exercises. Examples disclosed herein support remote clinical monitoring of patients via a body area network or home area network configured for use with a health monitoring system. More specifically, the remote clinical data collection and monitoring system includes, in part, the instrumented resistance exercise device provided to patients for exercise and rehabilitation use outside of a clinic or hospital setting. For example, patients may be taught to properly perform exercises using the instrumented resistance exercise device when they see their physician, physical therapist or other health care provider in a controlled clinical or laboratory setting. The patients may be provided an instrumented resistance exercise device to take with them to use while performing a prescribed exercise routine at home or other such non-controlled setting (e.g., outside of clinic). While home-based exercise programs consisting of resistance exercises may be prescribed and encouraged by health care providers, there is no easy way for which the physician, physical therapist or other such health care provider can monitor the patient's progress. Furthermore, it is difficult for patients and health care providers to keep track of performed exercise data such as exercise duration and repetition frequency. Such data may be useful to monitor and evaluate the progress efficacy of such home-based exercise programs.

Thus, various embodiments disclosed herein may help address prior limitations of home-based exercise programs. Data collected by the instrumented resistance exercise device may enable health care providers to: review daily physical therapy and/or resistance exercise activity performed remotely; remotely receive data and analyze the quality of exercises performed during physical therapy and/or resistance exercise activity; individualize and/or tailor a physical therapy and/or resistance exercise plan to better meet patient needs; provide encouragement to patients to stay on track with prescribed physical therapy and/or resistance exercise regimens; and provide feedback to patients should exercise performance goals not be met.

As used herein, to "tether" refers to enabling a mobile device to communicatively couple with a short range communication device to send and/or receive data and instructions between the mobile device and short-range communication device. For example, a mobile device is tethered to a force sensing assembly of an instrumented resistance exercise device via wireless communication between the force sensing assembly and the mobile device. In such examples, the force sensing assembly may send and receive data and other such instructions to/from the mobile device using wireless communication technology such as Bluetooth® Low Energy (BLE), WiFi®, Ultra-Wide Band (UWB), or other such communication protocol.

As used herein, a "resistance device app" and a "resistance device application" refers to a process of interacting with an instrumented resistance exercise device that is executed on a mobile device, a desktop computer, and/or within an Internet browser of a health care provider, a patient, or other such user of the instrumented resistance exercise device. For example, a resistance device application includes a mobile app that is configured to operate on a mobile device (e.g., smart watch, smart phone, a tablet computer, a wearable smart device, etc.), a desktop application that is configured to operate on a desktop computer, or a laptop computer, and/or a web application that is configured to operate within an Internet browser (e.g., a mobile-friendly website configured to be presented via a touchscreen or other user interface of a mobile device or desktop computer).

As used herein, a "network" and a "body area network" refers to a wired and/or wireless communication connection between components and devices of an instrumented resistance exercise device and a remote clinical data collection and monitoring system. For example, a short-range wireless communication device, a mobile device, a desktop computer, a remote data server and/or other such device are configured to operate within the body area network. As such, the short-range wireless communication device, the mobile device, the desktop computer, the remote data server, and/or other such device are configured to send and receive data and other such communicated information between one another using the body area network.

Turning to the figures, FIGS. 1, 2, 3, 4A, 4B, 8A, 8B, and 8C illustrate one exemplary instrumented resistance exercise device 100. In this illustrated example, the instrumented resistance exercise device 100 includes: a resistance band 120; a first handle 130 suitably attached to the resistance band 120; a second handle 140 suitably attached to the resistance band 120; and a force sensing assembly 150 suitably attached to the resistance band 120 and first handle 130. While the illustrated examples show the force sensing assembly 150 connected to the first handle 130 it should be appreciated that the force sensing assembly 150 may alternatively be attached to the second handle 140. Furthermore, in various embodiments the instrumented resistant exercise band 120 may include a plurality of force sensing assemblies 150 with at least one force sensing assembly 150 attached to each of the first handle 130 and the second handle 140.

Figure 1:
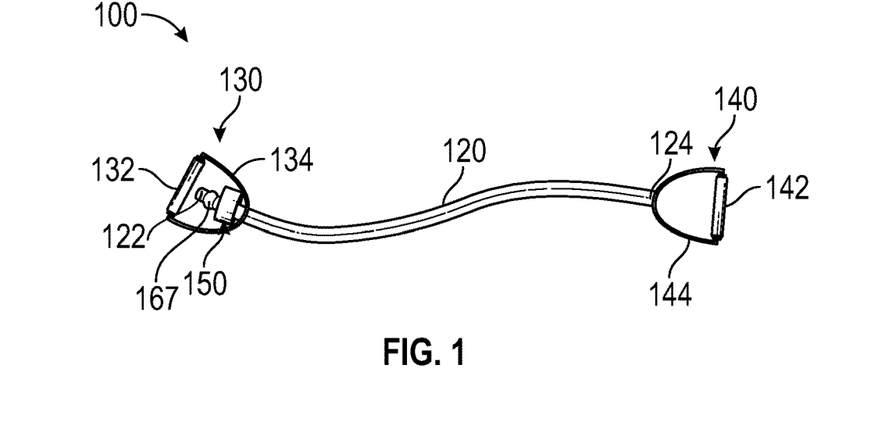
FIG. 1 illustrates an example embodiment of the instrumented resistance exercise device of the present disclosure.
Figure 2:
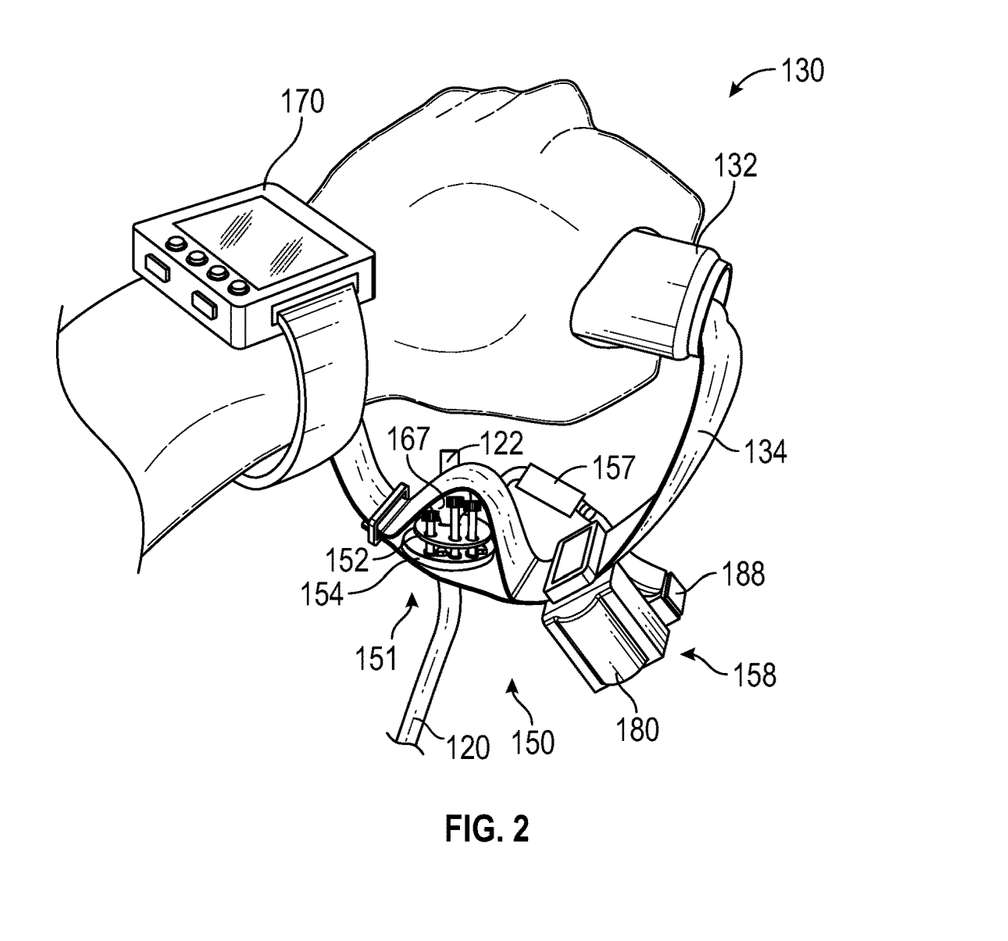
FIG. 2 illustrates an enlarged fragmentary perspective view of one of the handles grasped by a user of the instrumented resistance exercise device of FIG. 1, and showing the force sensing assembly including one example force sensing device connected to the resistance band and handle of the instrumented resistance exercise device of FIG. 1.

In the illustrated example, the resistance band 120 includes a first end 122 and a second end 124. As such, the first handle 130 is suitably attached to the resistance band 120 at the first end 122. Furthermore, the second handle 140 is suitably attached to the resistance band 120 at the second end 124. The first handle 130 includes a handle grip member 132 defined on a handle attachment member 134. In various embodiments, the handle attachment member 134 is configured to attach or otherwise connect the first handle 130 to the first end 122 of the resistance band 120. The second handle 140 includes a handle grip member 142 defined on a handle attachment member 144. In various embodiments, the handle attachment member 144 is configured to attach or otherwise connect the second handle 140 to the second end 124 of the resistance band 120. Accordingly, a patient or other such user may hold onto the handle grip members 132 and 142 while performing exercises that use the resistance band 120.

In certain embodiments, the resistance band 120 of the instrumented resistance exercise device 100 is a length of tubing, such as elastic tubing. In such embodiments, the instrumented resistance exercise device 100 includes a plurality of different resistance bands 120 associated with different levels of resistance (e.g., lower resistance or greater resistance). The specific resistance band 120 to attach to the first and second handles 130 and 140 may be selected based on a desired amount of resistance while performing exercises. In certain other embodiments for any of the aspects described herein the resistance band 120 is a flat band.

In the illustrated example, the force sensing assembly 150 is attached to the first end 122 of the resistance band 120 and positioned on or adjacent to the handle attachment member 134 of the first handle 130. As such, the force sensing assembly 150 is configured to monitor, detect, and measure a force applied between the first end 122 of the resistance band 120 and the first handle 130 when the instrumented resistance exercise device 100 is in use.

In certain embodiments, the force sensing assembly 150 includes a force sensing device; and a processing and communication module 158 communicatively coupled to the force sensing device 151. As best illustrated in FIGS. 2 to 4B, the force sensing device 151 includes: a top force plate 152; a bottom force plate 154 axially spaced apart from the top force plate 152; a force transducer or force sensor 156 attached to a top surface of the bottom force plate 154, the force sensor 156 communicatively coupled to the processing and communication module 158; a first standoff 160a attached to the top surface of the bottom force plate 154; a second standoff 160b attached to the top surface of the bottom force plate 154; a third standoff 160b attached to the top surface of the bottom force plate 154; a first fastener 162a extending through a first fastening aperture 163a defined in the top force plate 152 and aligning with a corresponding first fastening aperture 164a defined in the bottom force plate 154; a second fastener 162b extending through a second fastening aperture 163b defined in the top force plate 152 and aligning with a corresponding second fastening aperture 164b defined in the bottom force plate 154; a third fastener 162c extending through a third fastening aperture 163c defined in the top force plate 152 and aligning with a corresponding third fastening aperture 164c defined in the bottom force plate 154; a top resistance band pass-through 165 defined in the top force plate 152; and a bottom resistance band pass-through 166 defined in the bottom force plate 154.

Figure 3:
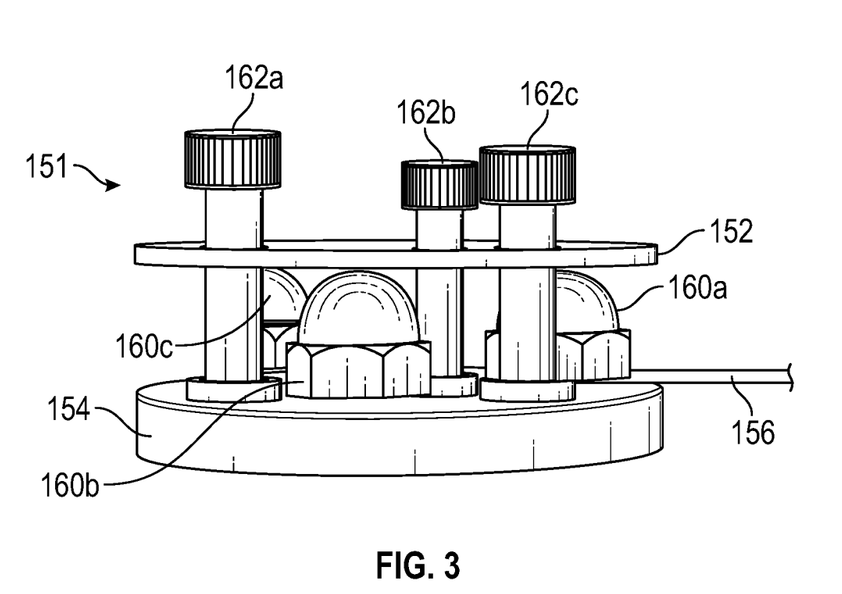
FIG. 3 illustrates an enlarged fragmentary perspective view of the force sensing assembly of the instrumented resistance exercise device of FIG. 1.
Figure 4A:
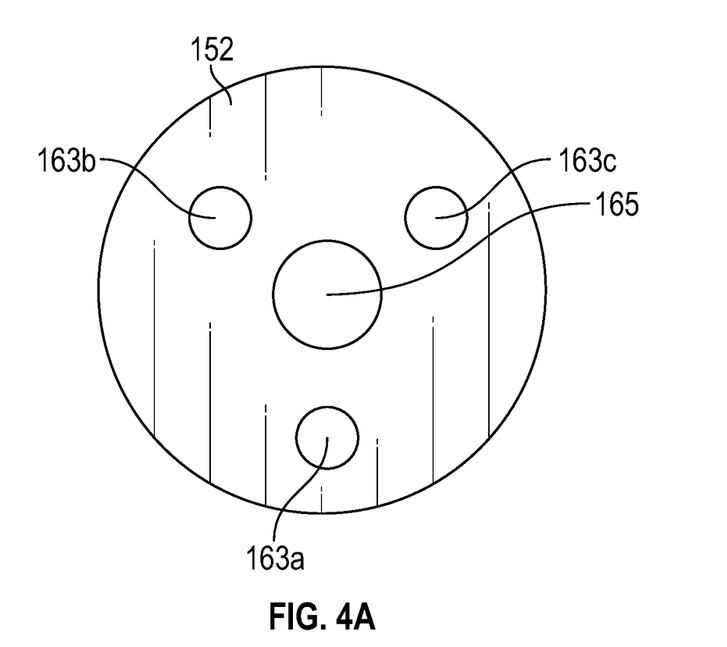
FIG. 4A, illustrates a top view of the bottom force plate of the force sensing assembly of the instrumented resistance exercise device of FIG. 1.
Figure 4B:
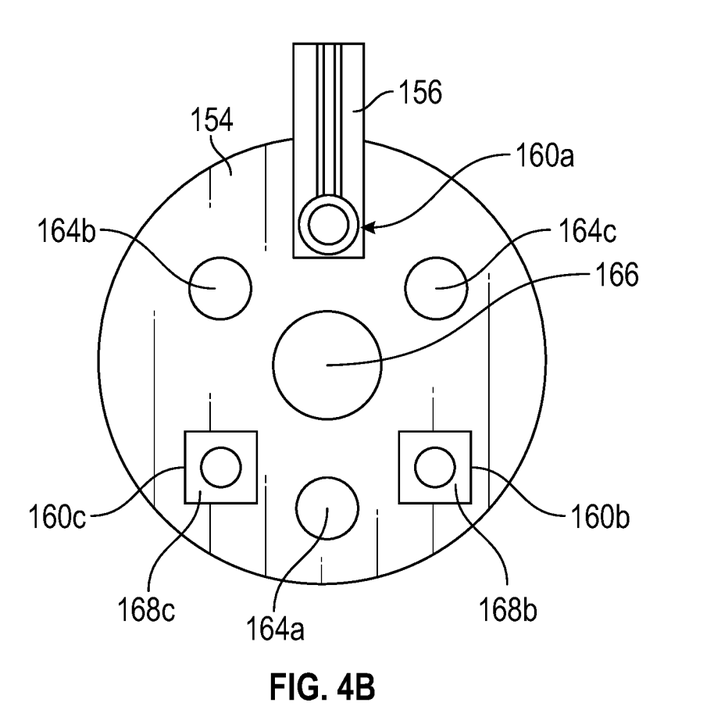
FIG. 4B illustrates a top view of the top force plate of the force sensing assembly of the instrumented resistance exercise device of FIG. 1.

In the illustrated example, the standoffs 160a, 160b, and 160c define an axial separation distance between the top and bottom force plates 152 and 154. As such, the standoffs 160a, 160b, and 160c are securely attached to the top surface of the bottom force plate 154. The top and bottom force plates 152 and 154 are positioned with respect to one another such that the top force plate 152 is separated from the bottom force plate 154 via the standoffs 160a, 160b, and 160c.

In the illustrated example, the fasteners 162a, 162b, and 162c are threaded fasteners such as screws. It will be appreciated that other types of fasteners are possible. The top and bottom force plates 152 and 154 are positioned such that the top fastener apertures 163a, 163b, and 163c are in axial alignment with and corresponding bottom fastener apertures 164a, 164b, and 164c. The fasteners 162a, 162b, and 162c extend through the top fastener apertures 163a, 163b, and 163c and 164c and are threaded into the corresponding bottom fastener apertures 164a, 164b, and 164c. As a result, a bottom surface of the top force plate 152 directly contacts a top portion of each standoff 160a, 160b, and 160c to define or otherwise set the axial separation distance between the top and bottom force plates 152 and 154.

In certain embodiments, the force sensor 156 is attached to or otherwise mounted on the top surface of the bottom force plate 154. Additionally, at least two shims 168b and 168c are attached to or otherwise mounted on the top surface of the bottom force plate 154. In the illustrated example, the first standoff 160a, is positioned on top of the force sensor 156 and securely attached to the top surface of the bottom force plate 154. The second standoff 160b and third standoff 160c are positioned on top of shims 168b and 168c, respectively. The second and third standoffs 160b, and 160c are securely attached to the top surface of the bottom force plate 154. In various embodiments, the shims 168b and 168c are configured with a thickness equal to the thickness of the force sensor 156 such that the standoffs 160a, 160b, and 160c define a uniform separation distance between the top and bottom force plates 152 and 154. As a result, when the top force plate 152 contacts each of the standoffs 160a, 160b, and 160c, any force (e.g., downward acting force) acting on the top force plate 152 will be equally distributed between the standoffs 160a, 160b, and 160c. Furthermore, the force acting on the top force plate 152 will be directed to a sensing area of the force sensor 156 via the standoffs 160, 160b, and 160c.

In certain embodiments, the first end 122 of the resistance band 120 extends through the bottom resistance band pass-through 166 defined in the bottom force plate 154 and the top resistance band pass-through 165 defined in the top force plate 152. A plug member 167 is inserted into the first end 122 of the resistance band 120. Furthermore, the plug member 167 has a larger diameter than a diameter of the bottom resistance band pass-through 166 and the top resistance band pass-through 165 to keep the resistance band 120 from slipping out of the resistance band pass-through 165 and 166. Thus, the plug member 167 helps maintain a desired position of the force sensing assembly 150 between the first end 122 of the resistance band 120 and the handle attachment member 134 of the first handle 130. In certain embodiments, during use of the instrumented resistance exercise device 100 the plug member 167 engages with the top surface of the top force plate 152 as the patient pulls the first handle 130 during exercise. As such, the force generated by engagement between the plug member 167 and the top force plate 152 is directed onto the sensing area or the force sensor 156. The profile of this generated force is captured and/or otherwise recorded by the force sensor 156 of the force sensing assembly 150.

In certain embodiments, the force sensor 156 includes a small-form factor force sensor, such as a force-sensitive resistor. It will be appreciated that alternative force transducers and sensors may be used.

In certain embodiments, the force sensor 156 further includes a guide element configured to ensure that force is evenly concentrated and/or distributed on the face of the force sensor 156. In certain embodiments, the force sensor 156 is configured to concentrate a known portion of the force, such as ⅓ of the force onto the sensing area of the force sensor 156. In certain embodiments, the small-form factor force sensor 156 includes a load-bearing standoff, two force plates and a guide structure to ensure that force is evenly concentrated and/or distributed on the face of the force sensor 156.

In another such embodiment, the force sensing assembly 150 includes an alternative exemplary force sensing device 251; and the processing and communication module 158 communicatively coupled to the force sensing device 251. As best illustrated in FIGS. 1, 8A, 8B, and 8C the force sensing device 251 includes: a fixed member 252 suitably connected to the handle connection member 134 and the first end 122 of the resistance band 120; and a resistance measurement device 254 suitably connected to the first end 122 of the resistance band 120. The resistance measurement device 254 is further communicatively coupled to the processing and communication module 158 via a connector 257.

Figure 8A:
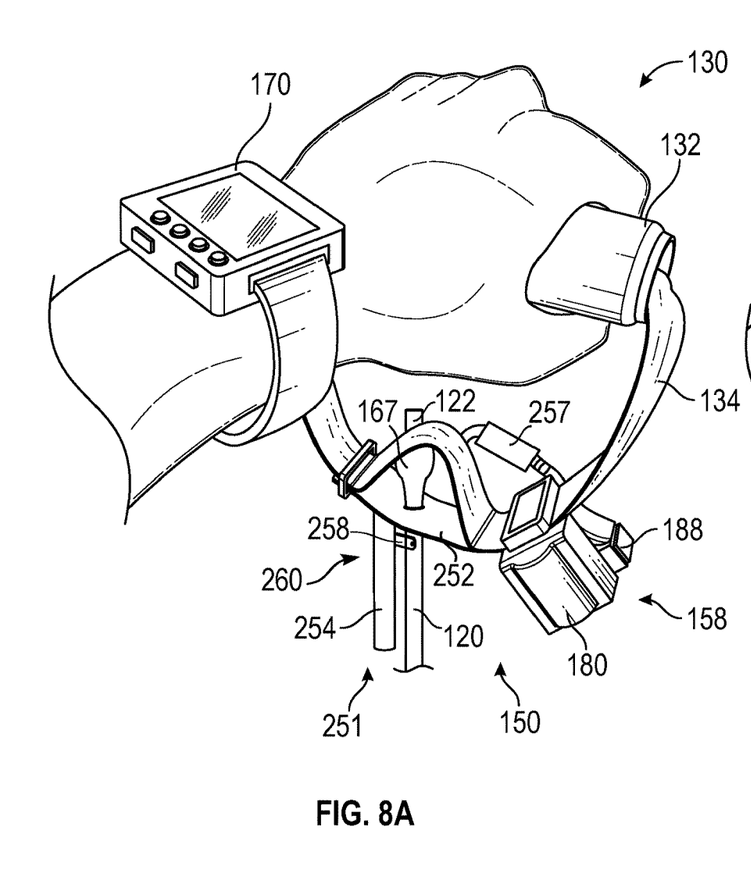
FIG. 8A illustrates an enlarged fragmentary perspective view of one of the handles grasped by a user of the instrumented resistance exercise device of FIG. 1, and showing the force sensing assembly including another example force sensing device connected to the resistance band and handle of the instrumented resistance exercise device of FIG. 1.
Figure 8B:
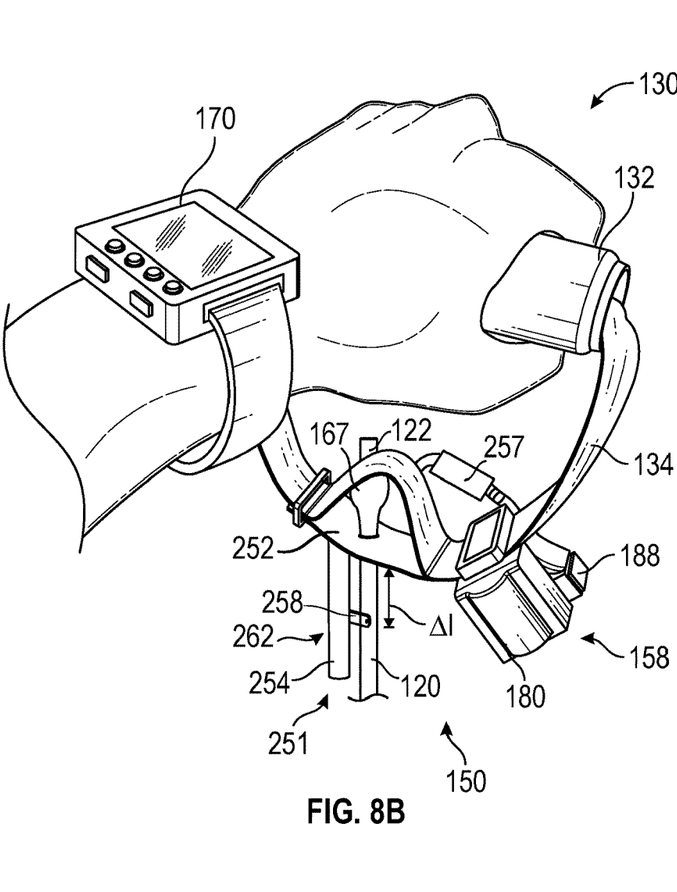
FIG. 8B illustrates an enlarged fragmentary perspective view of one of the handles grasped by a user of the instrumented resistance exercise device of FIG. 1, and showing the force sensing assembly including the example force sensing device of FIG. 8B in a translated position.

In the illustrated example, the fixed member 252 is a rigid planar member secured to the first handle 130. The fixed member 252 includes a pass-through (not shown) that enables the resistance band 120 to extend through the fixed member 252. The first end 122 of the resistance band 120 is secured to the fixed member 252 and the first handle 130 via the plug member 167. In certain embodiments, the resistance measurement device 254 is connected to and supported by the fixed member 252 such that the resistance measurement device 254 is held in place during use of the instrumented resistance exercise device 100.

In the illustrated example, the resistance measurement device 254 is configured as a strain sensor, an elongation sensor a potentiometer, or other such resistance measurement device. The resistance measurement device 254 includes a wiper member 258 suitably attached to the first end 122 of the resistance band 120. The wiper member 258 moves or translates relative to the main housing portion of the resistance measurement device. Thus, when the resistance band 120 is stretched the wiper member 258 translates from a first position 260 to a second position 262. Accordingly, the resistance measured by the resistance measurement device 254 changes as the wiper member 258 translates from the first and second positions 260 and 262 as shown by arrow Δ1. In certain embodiments, this resistance change correlates or otherwise relates to the force applied to the resistance band 120 of the instrumented resistance exercise device 100.

Certain aspects and embodiments of the force sensing assembly 150 disclosed herein provides particular advantages. For example, the small form factor of the force sensor 156, the resistance measurement device 254, the processing and communication module 158, and other components of the force sensing assembly 150 prevent interference with normal resistance exercise protocols by maintaining nearly normal weight profiles and by allowing full range of motion of the first and second handles 130 and 140 of the instrumented resistance exercise device 100. Additionally, the small form factor of the force sensor 156, the resistance measurement device 254, the processing and communication module 158, and other components of the force sensing assembly 150 allow for more efficient connection to the resistance band 120. Furthermore, the instrumented resistance exercise device 100 need not store all of the collected data on-board a local memory device coupled to the microprocessor. Rather, the force sensing assembly 150 is configured to wirelessly transmit data for storage on a local data-receiving device (e.g., a mobile device 170) and/or network.

In certain embodiments, the force sensing assembly 150 includes the processing and communication module 158 that is communicably coupled with the force sensor 156 and/or the resistance measurement device 254 via connector 157 and/or connector 257. The force sensor 156 and/or the resistance measurement device 254 are configured to collect force data during use of the instrumented resistance exercise device 100. The processing and communication module 158 is configured to receive the force data from the force sensor 156 and/or the resistance measurement device 254 and communicate this collected data to a mobile device 170 (e.g., the local data receiving device) or other such electronic device.

In certain embodiments (best illustrated in FIGS. 2, 5, 8A and 8B, the processing and communication module 158 includes: a housing 180 removably connected to the handle attachment member 134; a microcontroller 182 disposed within the housing 180; a communication module 184 (e.g., short-range wireless communication module) disposed within the housing 180 and communicatively coupled to the microcontroller 182; and a power source 186 (e.g., rechargeable battery) disposed within the housing 180 and connected to the microcontroller 182 and the communication module 184. The power source 186 is configured to provide power to the microcontroller 182 and the communication module 184 during use of the instrumented resistance exercise device 100. As such, various embodiments of the processing and communication module 158 further includes a power switch 188 that turns the power source 186 on and off. In certain embodiments, the housing 180 may be removable from the attachment member 134 such that the processing and communication module 158 enclosed in the housing 180 can travel with a patient and used with different instrumented resistance exercise devices 100 (e.g., devices having differing resistances of the resistance band 120).

In certain embodiments, the housing 180, includes one or more ports for connecting external components. For example, the housing 180 may include a port for charging the power source 186. Furthermore, the housing may have a port for connecting the force sensor 156 to the processing and communication module 158. As a result, data collected by the force sensor 156 is transferred to the processing and communication module 158.

In certain embodiments, the force sensing assembly 150 includes a user interface (e.g., one or more push buttons, indictor lights, etc.) such that the patient or other such user of the instrumented resistance exercise device 100 may use to control or otherwise monitor the force sensing assembly 150. In some such embodiments, the force sensing assembly 150 is configured to provide visual, audio, and/or tactile feedback during use of the instrumented resistance exercise device 100. For example, the force sensing assembly 150 user interface may include LED lights for visual feedback.

In certain embodiments, the processing and communication module 158 is configured to tune or otherwise calibrate the force sensor 156 and/or the resistance measurement device 254. As such, the user of the instrumented resistance exercise device 100 may use the user interface to calibrate the force sensor 156 and/or the resistance measurement device 254 of the force sensing assembly 150.

Figure 8C:
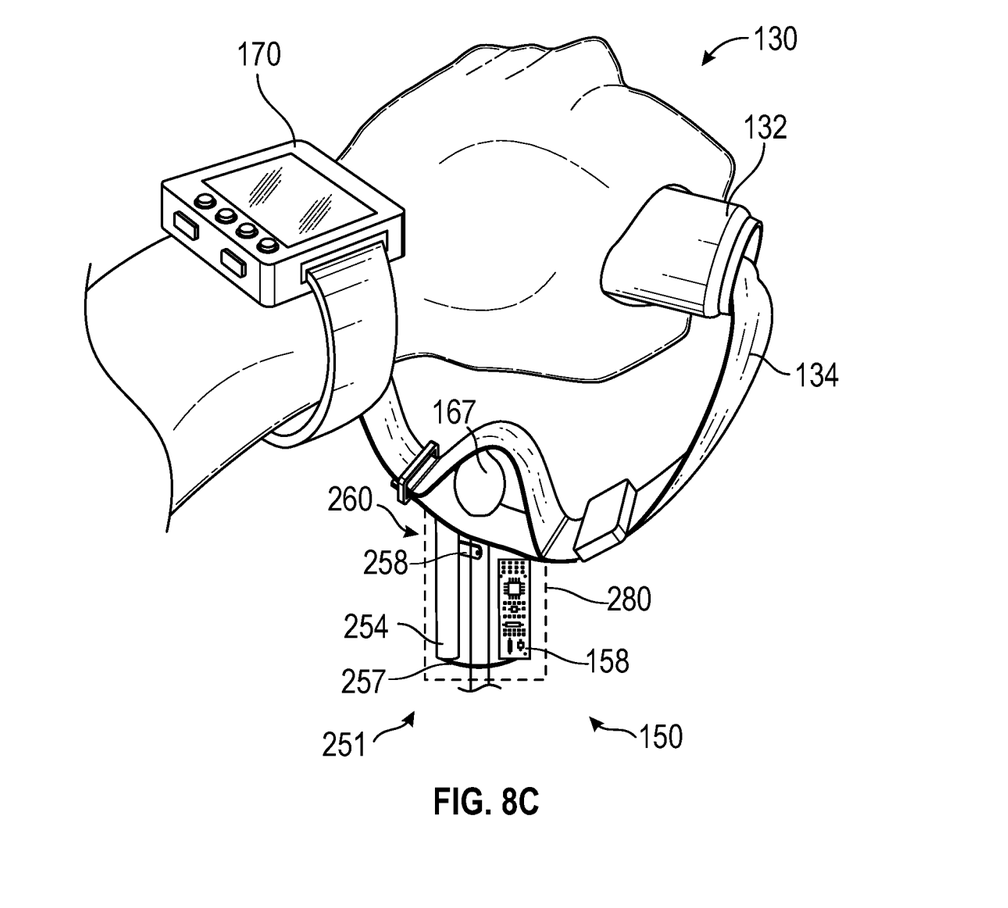
FIG. 8C illustrates an enlarged fragmentary perspective view of one of the handles grasped by a user of the instrumented resistance exercise device of FIG. 1, and showing the force sensing assembly including the example force sensing device of FIG. 8A and the processing and communication module enclosed in a common housing.

In certain embodiments, the instrumented resistance exercise device 100 includes a common housing 280, shown in dashed lines and best seen in FIG. 8C, or other such case configured to house components of the force sensing assembly 150. As such, the force sensing device 251 and the processing and communication module 158 are enclosed within the common housing 268. In certain embodiments, the common housing 280 attaches securely to the handle attachment member 134 or other such portion of the first handle 130. Furthermore, the housing 280 may be removable such that the force sensing assembly 150 enclosed in the housing can travel with a patient and used with different instrumented resistance exercise devices 100 (e.g., devices having differing resistances of the resistance band 120). It will be appreciated that the common housing 280 may be similarly configured to enclose the force sensing device 151 and the processing and communication module 158.

Figure 5:
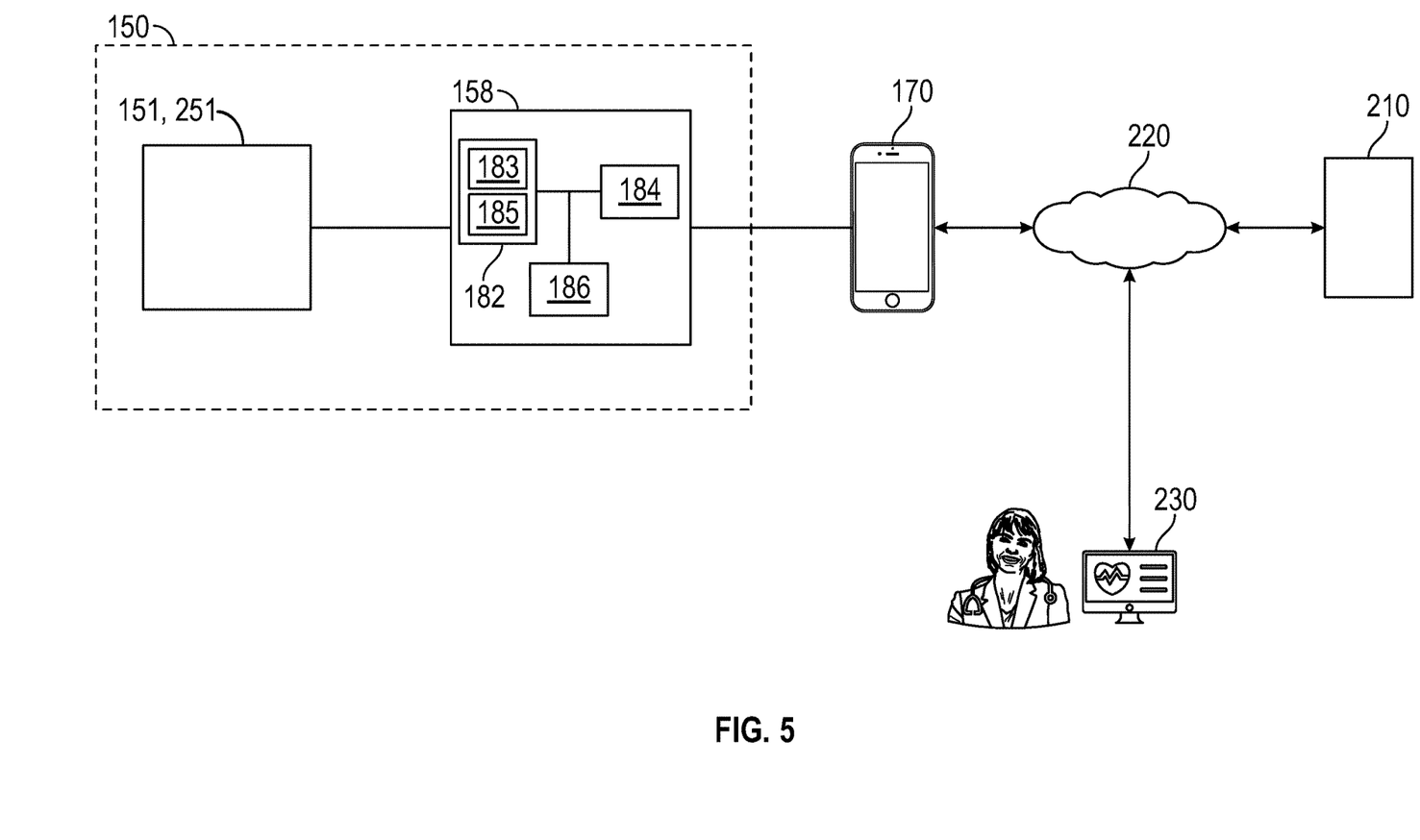
FIG. 5 illustrates a schematic view of the remote clinical data collection and monitoring system incorporating the force sensing assembly of the instrumented resistance exercise device of FIG. 1.

In the illustrated example, the microcontroller 182 includes a processor 183 or other such processing device such as, but not limited to, a microprocessor, a microcontroller-based platform, an integrated circuit, one or more field programmable gate arrays (FPGAs), and/or one or more application-specific integrated circuits (ASICs). The microcontroller 182 further includes a memory device 185 configured to store data and other such information used by the microcontroller 182. The memory device 185 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile memory, solid-state memory, etc.), unalterable memory (e.g., EPROMs), read-only memory, and/or high-capacity storage devices (e.g., hard drives, solid state drives, etc.)

In various embodiments, the microcontroller 182 further includes an analog to digital converter (ADC) configured to convert an analog signal to a digital signal. For example, the force sensor 156 may output a voltage signal or other such analog signal in response to the amount of force directed to the sensing area of the force sensor 156. The microcontroller 182 ADC converts the analog signal (e.g., voltage) to a digital signal that can be analyzed by the microcontroller 182. Additionally, the processing and communication module 158 may transmit the digital signal another computing device for further analysis.

In various embodiments, the memory device 185 is computer readable media on which one or more sets of instructions, such as the logic or software for operating the methods of the present disclosure, can be embedded. For example, the instructions reside completely, or at least partially, within any one or more of the memory device 185, the computer readable medium, and/or within the processor 183 during execution of the instructions.

In the illustrated example, the communication module 184 is configured to communicatively connect the processing and communication module 158 to the mobile device 170 (e.g., a smart watch, a smart phone, a tablet computer, a laptop computer, any other such mobile device and/or combinations therein) of the patient or user of the instrumented resistance exercise device 100. Accordingly, the communication module 184 includes hardware and firmware to establish a wireless connection between the processing and communication module 158 and the mobile device 170. For example, the communication module 184 is a wireless personal area network (WPAN) module that wirelessly communicates with the mobile device 170 via short-range wireless communication protocols. In various embodiments, the communication module 184 implements the Classic Bluetooth®, Bluetooth®, and/or Bluetooth® Low Energy (BLE) protocols. Additionally, or alternatively, the communication module 184 is configured to wirelessly communicate via WiFi®, WiFI®low power, Near Field Communication (NFC), Ultra-Wide Band (UWB), and/or any other short-range and/or local wireless communication protocol (e.g., IEEE 802.11 a/b/g/n/ac) that enables the communication module 184 to communicatively couple to the mobile device 170.

FIG. 5 illustrates one exemplary remote clinical data collection and monitoring system 200 which incorporates the instrumented resistance exercise device 100 discussed above and illustrated in FIGS. 1 to 4B, and 8A to 8C. More specifically, the remote clinical monitoring system 200 includes: the force sensing assembly 150 configured to collect force and other such data during use of the instrumented resistance exercise device 100; the mobile device 170 communicatively coupled with the force sensing assembly 150; a remote data server 210 communicatively coupled with the mobile device 170 via a network 220; and a remote clinician device 230 communicatively coupled with the mobile device 170 and the remote data server 210 via the network 220.

In various embodiments, the remote clinical data collection and monitoring system 200 is configured to collect data from a patient or other such user of the instrumented resistance exercise device 100. More specifically, the force sensing assembly 150 is configured to measure and record the force profile of the patient performing exercises using the instrumented resistance exercise device 100. The force sensing assembly 150, via the processing and communication module 158, is communicatively coupled or otherwise tethered to the patient's mobile device 170 (e.g., local data receiving device). In various embodiments, the processing and communication module 158 is configured to transmit the force profile collected by the force sensing device 151, 251 to the mobile device 170 using BLE or other such short-range wireless communication protocol.

In various embodiments, the mobile device 170 is configured with or otherwise includes an resistance device application or other such software associated with the instrumented resistance exercise device 100. In such embodiments, the patient may activate the resistance device application on the mobile device 170 (e.g., smart watch, smart phone, or other such mobile device) before starting an exercise session with the instrumented resistance exercise device 100. Once activated, the resistance device application initiates a tethering sequence between the mobile device 170 and the force sensing assembly 150. The mobile device 170 will display a connection confirmation to the patient indicating that the mobile device 170 and force sensing assembly 150 are tethered or otherwise communicatively coupled. Furthermore, the resistance device application displays a variety of exercises for the patient to perform (e.g., elbow flexion, shoulder lift, sated row, and triceps extension) and an option for different resistance bands to be used with the instrumented resistance exercise device 100 (e.g., bands having different levels of resistance). The resistance device application enables the patient to select the specific exercise and resistance band used for the current exercise session. Once the patient enters the proper selections, the patient starts performing the exercise with the instrumented resistance exercise device 100. The force sensing assembly 150 sends the collected force data to the mobile device 170. In various embodiments, the resistance device application displays the data as it is received from the force sensing assembly 150. Additionally, once the patient completes the exercise the resistance device application may display an exercise summary to the patient. Furthermore, when the exercise is complete, the patient can transmit the data from the mobile device 170 to the remote data server 210 or other such storage location via the network 220.

In various embodiments, the remote clinical data collection and monitoring system 200 establishes a secure data communication pathway that enables processing of data collected by the force sensing assembly 150 into meaningful outputs for the patient (e.g., user of instrumented resistance exercise device 100) and/or clinician (e.g., physician, physical therapist, or other such health care provider). The data collected by the force sensing assembly 150 of the instrumented resistance exercise device 100 can be analyzed to provide exercise performance information to the patient and/or clinician such as, but not limited to, maximum force output, number of repetitions completed, and time to complete exercise or repetition. Additionally, the data collected by the force sensing assembly 150 may be analyzed to determine strength data based on the force data generated during exercise.

The remote clinical data collection and monitoring system 200 can also provide more complex data analysis such as feedback on the shape of the force curves as they pertain to proper exercise form. In various embodiments, the collected and analyzed data can be displayed via a visual display of the mobile device 170 and/or the remote clinician device 230 (e.g., smart phone display, smart watch display, tablet computer display, laptop computer display, network terminal display, etc.). Furthermore, the collected data may be periodically offloaded to the remote data server 210 or other such network-based repository (e.g., secure website, secure cloud-based storage, etc.) so that the clinician can review the information asynchronously. In various embodiments, the remote data collection and monitoring system 200 may be configured to enable the clinician to send feedback to the patient based on the collected data analysis via the network 220. For example, the clinician may transmit a message to a specific user's mobile device 170 about exercise performance and reminders to perform exercise can also be included via the data-receiving device. Furthermore, the remote data collection and monitoring system 200 may be configured to send audio and/or tactile feedback (like vibrations) to the mobile device 170 to provide real time feedback to the patient.

In various embodiments, the remote clinical data collection and monitoring system 200 enables the clinician to review useful summarized metrics about patient performance on exercises over time (e.g., daily, weekly, monthly, etc.). Such review may be implemented via, for example, a secure webpage accessed over the network 220. In some such embodiments, viewing features include the ability to review a single exercise session or daily/weekly/monthly exercise summaries broken down by a specific exercise or series of exercises. A clinician dashboard displayed by the remote clinician device 230 can allow for the review of multiple patients, as well as enable the clinician to send direct feedback to the patient's mobile device 170.

In various embodiments, use of the remote data collection and monitoring system 200 by a clinician or other health care provider and a patient involves one or more of the following: (1) a health care provider, such as a clinician (physician or physical therapist), recommending and teaching an exercise or set of exercises; (2) the patient obtaining an instrumented resistance exercise device 100 and a data-receiving device configured to receive resistance exercise data such as mobile device 170; (3) the patient performing the resistance exercises in an unsupervised setting using the instrumented resistance exercise device 100; (4) the instrumented resistance exercise device 100 transmitting resistance exercise data to the mobile device 170; (5) the mobile device 170 transmitting the received data via the network 220 to the remote data server 210; and/or (6) the patient and/or clinician reviewing the data periodically and using that information to generate and/or update healthcare plans.

In various embodiments, the remote data collection and monitoring system 200 enables the clinician to remotely monitor progress of a patient treatment plan. Such remote monitoring capabilities enables the clinician and/or other health care provider, to: (1) review daily physical therapy activity via, for example, a wireless, Bluetooth modality; (2) evaluate the quality of the exercises performed; (3) allow individualization and tailoring of a fitness and strength training plan to better meet the patient's needs; (4) give/receive encouragement to stay on track with the patient's exercise regimen(s); and (5) encourage the patient to push themselves should treatment and/or progress goals not be met. In various embodiments the remote data collection and monitoring system 200 enables the clinician to monitor and tailor the patient's treatment plan while the patient performs the exercises in a remote (e.g., home-based, or otherwise unsupervised) setting. These advantages are particularly useful in rural and/or remote regions that have broadband or cellular access enabling transmission of data to healthcare settings at a distance away.

In certain embodiments, the remote data collection and monitoring system 200 further includes one or more additional sensors configured to collect physiological and/or environmental data. For example, the mobile device 170 incorporated with the remote data collection and monitoring system 200 may include a temperature sensor, a light sensor, an optical sensor or other such sensor for measuring heart rate, blood oxygen saturation, or other such physiological information.

In certain embodiments, the mobile device 170 or other such local data-receiving device communicatively coupled with the force sensing assembly 150 is configured to wirelessly receive and optionally store, resistance exercise data from the instrumented resistance exercise device 100. In some such embodiments, the mobile device 170 is a smart watch, a smart phone, or other such smart mobile device. Furthermore, the mobile device 170 is a BLE-enabled device configured to send data to and receive data from the force sensing assembly 150. In certain embodiments, the mobile device 170 is further configured to collect and/or wirelessly receive additional physiological and/or environmental data related to the patient's heath.

In certain embodiments, the mobile device 170 is configured to transmit resistance exercise data to a remote data server 210 via a network 220. A health care provider may access the resistance exercise data on the remote data server 210 via the network 220 and provide feedback to the patient via the network 220. Such feedback may include recommended adjustments to the exercise regimen, the adjustments including but not limited to, the duration, extent and/or repetition of the patient's exercise regimen.

Accordingly, the device, methods and systems described herein may be implemented over or as part of a body area health network. In some such embodiments, resistance exercise data can be combined with other information, such as other physiological data or environmental data. In some such embodiments, resistance exercise data, and, optionally, the other information, is accessible to a health care provider, for example by using wireless, real-time data communication to transmit the data to the health care provider's network. In some such embodiments, a health care provider can review resistance exercise data, and, optionally, the other information, and subsequently provide feedback remotely, for example to the patient's local data-receiving device.

EXAMPLES

Example 1. Bench Top Tests

Weights of 0.2, 5, 10 and 15 lb were applied to the force sensing assembly 150 The force data collected by the force sensor 156 was sent to the processing and communication module 158. The received data was wirelessly transmitted via BLE to the mobile device 170 communicatively coupled to the force sensing assembly 150. The resistance device application or software executed on the mobile device 170 enabled real-time display of collected force data. Mean±standard deviation and variability (%) of the collected force data was measured and analyzed.

TABLE 1

| Repeatability of Sensor | | | | | | |
|---|---|---|---|---|---|---|
| Weight (lb) | Trial 1 | Trial 2 | Trial 3 | Mean | Std Dev | Δ (%) |
| 0.25 | 0.5 | 0.62 | 0.65 | 0.59 | 0.08 | 23.1 |
| 5.25 | 1.64 | 1.88 | 2.08 | 1.87 | 0.22 | 21.2 |
| 10.25 | 2.37 | 2.61 | 2.81 | 2.60 | 0.22 | 15.7 |
| 15.25 | 3 | 3.2 | 3.24 | 3.15 | 0.13 | 7.4 |

The response of the force sensor 156 was found to be repeatable and linear.

Example 2. Lateral Raises

Twenty six (26) healthy young adults performed 10 lateral raises using the instrumented resistance exercise device 100. Force data collected by the force sensing assembly 150 was transmitted via BLE from the force sensing assembly 150 to the mobile device 170. The mobile device 170 subsequently transmitted the data to investigators (e.g., clinicians) for further analysis.

Figure 6:
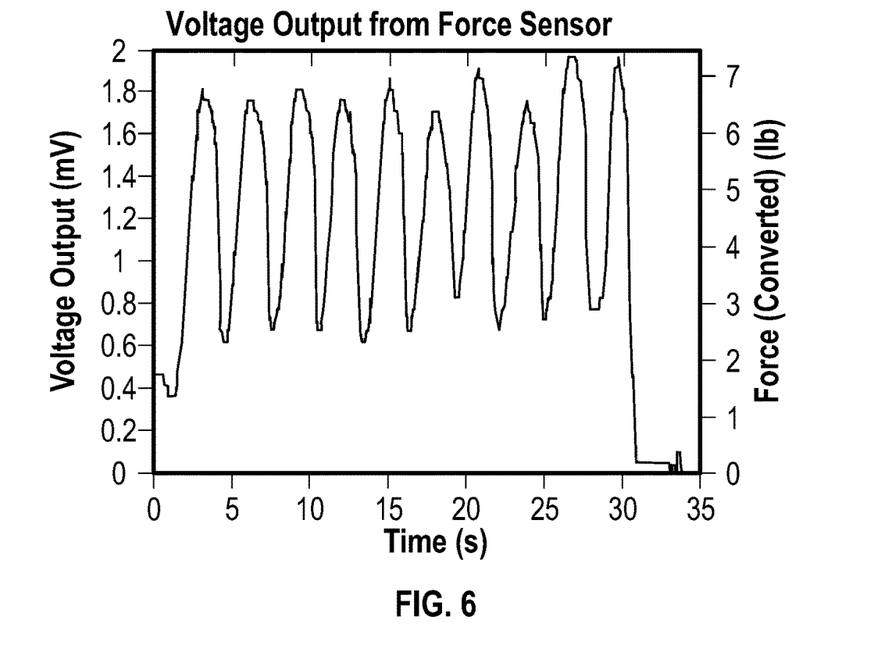
FIG. 6 is a graphical plot illustrating an exemplary data output from the force sensing assembly of the instrumented resistance exercise device of FIG. 1.

FIG. 6 shows an exemplary data output from the force sensing assembly 150. In all cases, each repetition of the performed exercise was clearly visible. Raw data was converted to voltage (V) on the left axis and force (lb) on the right axis. Force conversion was performed using the following equation: force=5.73×voltage−3.99. The force conversion is a direct result of the linear fit of the sensor determined from the sensor repeatability shown in Table 1. Elongation data (length of the resistance band at maximum stretch) was converted to theoretical force using the resistance band linear fit conversion. The average percent difference between predicted forces from elongation and converted forces from real data is nearly 67%±79.3%.

Example 3. Data Analysis Using Peak Detection Algorithm

Figure 7:
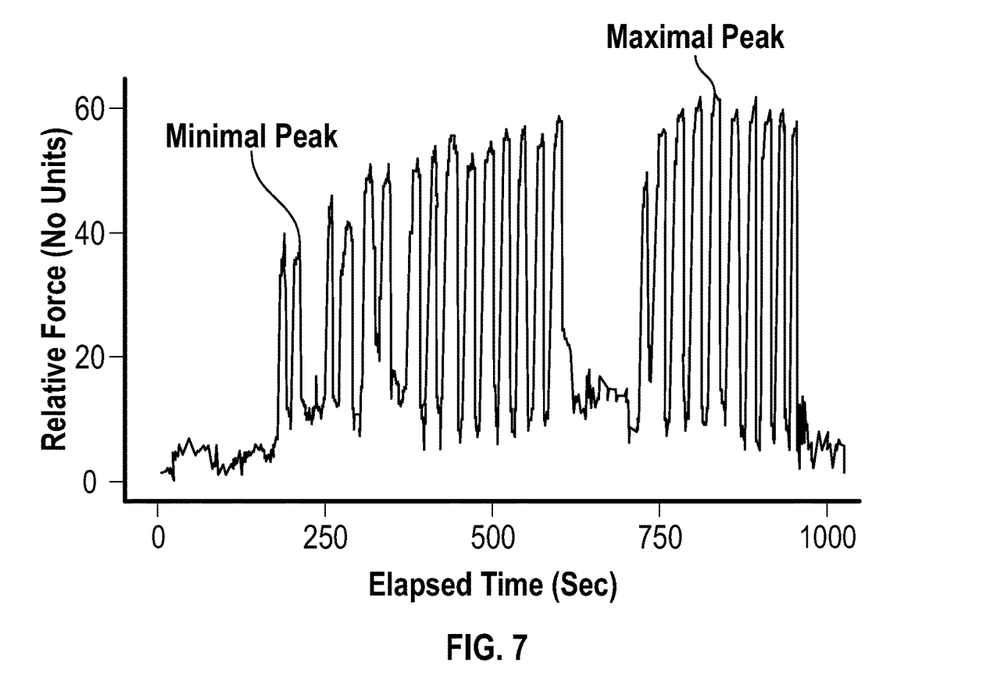
FIG. 7 is a graphical plot illustrating a number of exercise repetitions determined from data collected by the force sensing assembly of the instrumented resistance exercise device of FIG. 1.

Participants performed four different exercises selected to promote muscle strengthening: elbow flexion; shoulder lift; seated rows; and triceps extension. Each exercise was carried out in succession with time for rest. Data collected by the force sensing assembly 150 was examined with a peak detection algorithm that determined a number of repetitions of each exercise performed. FIG. 7 illustrates one example set of data collected by the force sensing assembly 150 and analyzed by the peak detection algorithm. The algorithm defined each repetition as a peak of the relative force exerted on the resistance band 120 and measured by the force sensing assembly 150. The algorithm used in the data analysis included: a local regression (LOESS) smoothing with a second-degree polynomial term; calculating the change in slope between each reading; and removing any peaks that did not exceed a pre-defined minimum value. The total number of repetitions performed for each exercise was determined from the sum of the number of peaks identified for that exercise. Noise from the collected data was assessed as the ratio of the LOESS smoothed to recorded value, and the signal-to-noise ratio (SNR) was subsequently assessed. In view of this disclosure it is noted that the methods and apparatus can be implemented in keeping with the present teachings. Further, the various components, materials, structures and parameters are included by way of illustration and example only and not in any limiting sense.

In view of this disclosure, the present teachings can be implemented in other applications and components, materials, structures and equipment to implement these applications can be determined, while remaining within the scope of the appended claims.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or." The terms "includes," "including," and "include" are inclusive and have the same scope as "comprises," "comprising," and "comprise" respectively.

Unless otherwise indicated, the terms "first", "second", "third", and other ordinal numbers are used herein to distinguish different elements of the present apparatus and methods, and are not intended to supply a numerical limit. For instance, reference to first and second openings should not be interpreted to mean that the apparatus only has two openings. An apparatus having first and second elements can also include a third, a fourth, a fifth, and so on, unless otherwise indicated.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. An instrumented resistance exercise device (100) comprising:
    a resistance band (120) having a first end (122) and a second end (124);
    a first handle (130) connected to the first end (122) of the resistance band (120);
    a second handle (140) connected to the second end (124) of the resistance band (120); and
    a force sensing assembly (150) positioned between the first handle (130) and the first end 122 of the resistance band (120), the force sensing assembly (150) comprising:
        a force sensor (156) connected to the resistance band (120),
        a microcontroller (182) communicatively coupled to the force sensor (156) and configured to receive a set of load force measurements collected by the force sensor (156),
        a short-range wireless communication module (184) coupled to the microcontroller and configured to transmit the set of load force measurements to a local-data-receiving device (170),
        a top force plate (152) and a bottom force plate (154); the force sensor (156) attached to a top surface of the bottom force plate (154); and
        a first standoff (160a) and a second standoff (160b) positioned between the top force plate (152) and the bottom force plate (154), wherein the first and second standoffs (160a, 160b) define an axial spacing between the top and bottom force plates (152, 154).

2. The instrumented resistance exercise device (100) of claim 1, wherein the short-range wireless communication module (184) is a Bluetooth Low Energy (BLE) module communicatively coupled to the local-data-receiving device (170).

3. The instrumented resistance exercise device (100) of claim 1, wherein the force sensor (156) comprises a small-form factor force sensor.

4. The instrumented resistance exercise device (100) of claim 3, wherein the small-form factor force sensor is a force-sensitive resistor.

5. The instrumented resistance exercise device (100) of claim 1, wherein the first end (122) of the resistance band (120) is connected to and engaged with the top force plate (152) of the force sensing assembly (150).

6. The instrumented resistance exercise device (100) of claim 5, wherein one of the first and second standoffs (160a, 160b) is positioned on top of the force sensor (156) such that a load force generated by the first end (122) of the resistance band (120) acting on the top force plate (152) is directed to a sensing area of the force sensor (156).

7. The instrumented resistance exercise device (100) of claim 1, wherein at least a portion of the force sensing assembly (150) is enclosed in a housing (180), and wherein the housing (180) is removable from the instrumented resistance exercise device (100).

8. A method for remote clinical monitoring of a prescribed set of exercises performed using an instrumented resistance exercise device (100), the method comprising:
    connecting a force sensing assembly (150) of the instrumented resistance exercise device (100), via a processing and communication module (158), to a local-data-receiving device (170);
    recording a force profile generated by a patient performing a resistance exercise using the instrumented resistance exercise device (100);
    transmitting the force profile, via the processing and communication module (158), to the local-data-receiving device (170); and
    transmitting, via the local-data-receiving device (170), the force profile to a remote data server (210), wherein the force profile on the remote data server (210) is accessed and analyzed by a health care provider via a network (210), and wherein analysis of the force profile enables the health care provider to adjust the prescribed set of exercises for the patient;
    wherein the force sensing assembly (150) comprises:
    a top force plate (152) and a bottom force plate (154);
    a force sensor 156 attached to a top surface of the bottom force plate (154); and a first standoff (160a) and a second standoff (160b) positioned between the top force plate (152) and the bottom force plate 154, wherein the first and second standoffs (160a, 160b) define an axial spacing between the top and bottom force plates (152, 154).

9. The method of claim 8, wherein the local-data-receiving device (170) is one of a smart watch, a smart phone, and a tablet computer, and wherein the local-data-receiving device (170) is configured with a resistance device application configured to interact with the instrumented resistance exercise device (100).

10. The method of claim 8, wherein the force profile further comprises maximum force output, number of repetitions completed, and/or time to complete exercise or repetition.

11. The method of claim 8, wherein one of the first and second standoffs (160a), (160b) is positioned on top of the force sensor (156) such that a load force acting on the top force plate (152) is directed to a sensing area of the force sensor (156).

12. The method of claim 8, further comprising analyzing the force profile and other health data, and wherein the health care provider transmits a revised prescribed set of exercises to the patient based on the analysis of the force profile and other health data.

13. The method of claim 8, further comprising analyzing the force profile, and wherein the health care provider transmits a revised prescribed set of exercises to the patient based on the analysis of the force profile.

14. An instrumented resistance exercise device (100) comprising:
a resistance band (120) having a first end (122) and a second end (124);
a first handle (130) connected to the first end (122) of the resistance band (120); and
a force sensing assembly (150) positioned between the first handle (130) and the first end 122 of the resistance band (120), the force sensing assembly (150) comprising:
a force sensor (156) connected to the resistance band (120),
a microcontroller (182) communicatively coupled to the force sensor (156) and configured to receive a set of load force measurements collected by the force sensor (156),
a short-range wireless communication module (184) coupled to the microcontroller and configured to transmit the set of load force measurements to a local-data-receiving device (170),
a top force plate (152) and a bottom force plate (154);
the force sensor (156) attached to a top surface of the bottom force plate (154); and
a first standoff (160a) and a second standoff (160b) positioned between the top force plate (152) and the bottom force plate (154), wherein one of the first and second standoffs (160a, 160b) is positioned on top of the force sensor (156) such that a load force generated by the first end (122) of the resistance band (120) acting on the top force plate (152) is directed to a sensing area of the force sensor (156).

15. The instrumented resistance exercise device (100) of claim 14, wherein the short-range wireless communication module (184) is a Bluetooth Low Energy (BLE) module communicatively coupled to the local-data-receiving device (170).

16. The instrumented resistance exercise device (100) of claim 14, wherein the force sensor (156) comprises a small-form factor force sensor.

17. The instrumented resistance exercise device (100) of claim 16, wherein the small-form factor force sensor is a force-sensitive resistor.

18. The instrumented resistance exercise device (100) of claim 14, wherein the first end (122) of the resistance band (120) is connected to and engaged with the top force plate (152) of the force sensing assembly (150).

19. The instrumented resistance exercise device (100) of claim 14, wherein at least a portion of the force sensing assembly (150) is enclosed in a housing (180), and wherein the housing (180) is removable from the instrumented resistance exercise device (100).

20. A method for remote clinical monitoring of a prescribed set of exercises performed using the instrumented resistance exercise device (100) of claim 14, the method comprising:
connecting the force sensing assembly (150) of the instrumented resistance exercise device (100), via a processing and communication module (158), to the local-data-receiving device (170);
recording a force profile generated by a patient performing a resistance exercise using the instrumented resistance exercise device (100);
transmitting the force profile, via the processing and communication module (158), to the local-data-receiving device (170); and
transmitting, via the local-data-receiving device (170), the force profile to a remote data server (210), wherein the force profile on the remote data server (210) is accessed and analyzed by a health care provider via a network (210), and wherein analysis of the force profile enables the health care provider to adjust the prescribed set of exercises for the patient.

* * * * *